US006613823B1

(12) United States Patent
Battiste et al.

(10) Patent No.: US 6,613,823 B1
(45) Date of Patent: Sep. 2, 2003

(54) PHOSPHITE ADDITIVES IN POLYOLEFINS

(75) Inventors: David R. Battiste, Bartlesville, OK (US); Mark K. Russell, Bartlesville, OK (US); William R. Coutant, Bartlesville, OK (US); Joseph R. Harder, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/176,125

(22) Filed: Oct. 21, 1998

(51) Int. Cl.[7] .............................................. C08K 5/523
(52) U.S. Cl. ........................ 524/127; 524/349; 524/350; 524/351; 524/352; 524/353
(58) Field of Search .................................. 524/120, 247, 524/424, 389, 388, 127, 349, 350, 351, 352, 353; 558/7

(56) References Cited

U.S. PATENT DOCUMENTS

| | | | | | |
|---|---|---|---|---|---|
| 3,219,622 A | * | 11/1965 | Lucians et al. | ............. | 524/389 |
| 4,116,926 A | * | 9/1978 | York | ......................... | 524/120 |
| 4,290,941 A | | 9/1981 | Zinke et al. | ......... | 260/45.85 B |
| 4,341,880 A | * | 7/1982 | Toyoda et al. | ............... | 524/120 |
| 4,371,647 A | * | 2/1983 | Minagawa et al. | ......... | 524/120 |
| 4,504,615 A | * | 3/1985 | Mills | ........................ | 524/389 |
| 4,590,231 A | | 5/1986 | Seltzer et al. | ............... | 524/100 |
| 4,824,885 A | * | 4/1989 | Magni et al. | ............... | 524/120 |
| 4,957,956 A | * | 9/1990 | Neri et al. | ................... | 524/120 |
| 5,023,285 A | * | 6/1991 | Horn | .......................... | 524/120 |
| 5,106,892 A | * | 4/1992 | Chiolle et al. | .............. | 524/120 |
| 5,225,526 A | * | 7/1993 | Fukawa et al. | ............. | 524/119 |
| 5,438,086 A | | 8/1995 | Stevenson et al. | .......... | 524/120 |

OTHER PUBLICATIONS

Klender et al "Futher Studies . . . Polyoletins" ANTEC Conference 1985, Baton Rouge, La. pp 225–245.*

* cited by examiner

*Primary Examiner*—Peter Szekely
(74) *Attorney, Agent, or Firm*—Kilpatrick Stockton LLP

(57) ABSTRACT

The whiteness and stability of a polyolefin have been found to be improved upon addition of a first phosphite, an arylalkyl diphosphite, and a second phosphite selected from the group consisting of a second arylalkyl diphosphite and a triarylphosphite. In addition, the addition of a triarylphosphite with an arylalkyl diphosphite has as been found to improve the hygroscopic nature and the hydrolytic stability of the arylalkyl diphosphite.

32 Claims, No Drawings

PHOSPHITE ADDITIVES IN POLYOLEFINS

FIELD OF INVENTION

This invention is related to the field of polyolefins. Particularly, this invention relates to the field of phosphite additives to polyolefins.

BACKGROUND OF THE INVENTION

Polymers are used in a variety of diverse applications. For example, such applications include food packaging, electronic components, automobile parts, fibers and fabrics, and medical equipment. Polymers could not perform such diverse functions without the assistance of a very broad range of polymer additives. Without additives, polymers can degrade during processing and over time can lose impact strength, discolor, and become statically charged. Additives not only overcome these and other limitations, but also can impart improved performance properties to the final product.

One type of additive is antioxidants which usually are used to retard the oxidative degradation of polymers. Degradation can be initiated when free radicals, highly reactive species with an unpaired electron, are created in polymers by heat, ultraviolet radiation, mechanical shear, and/or metallic impurities. It is believed when a free radical is formed, a chain reaction can begin that initiates polymeric oxidation. Subsequent reaction of the radical with an oxygen molecule can yield a peroxy radical, which then can react with an available hydrogen atom to form an unstable hydroperoxide and another free radical. In the absence of an antioxidant, these reactions can become self-propagating and can lead to polymer degradation.

There are two basic types of antioxidants, primary and secondary antioxidants. It is believed that primary antioxidants can intercept and stabilize free radicals by donating active hydrogen atoms. It also is believed that secondary antioxidants can prevent formation of additional free radicals by decomposing unstable hydroperoxides into a stable product. When primary antioxidants, such as hindered phenols, are utilized, polymers can have a more yellow color than unstabilized polymers, therefore decreasing the commercial value of polymers. Secondary antioxidants, such as phosphite compounds, often are utilized to increase the stability and whiteness of polymers.

Unfortunately, phosphite additives also can create difficulties in polymer production and applications. First, some phosphite additives are hygroscopic and upon absorption of water, phosphites can clump and can be difficult to feed into the polymer production process. Some phosphites are hydrolytically unstable and can react with water resulting in a lower active phosphite concentration for stabilizing polymers. Furthermore, this hydrolysis reaction can leave moisture and acidic residues in polymers. There is a need in the polyolefin industry for a hydrolytically stable phosphite additive product that increases polymer stability and improves the whiteness of polymers.

SUMMARY OF THE INVENTION

It is an object of this invention to provide a composition comprising a polyolefin that has improved color and stability.

It is another object of this invention to provide a process to produce a composition comprising a polyolefin that has improved color and stability.

It is a further object of this invention to provide a process to improve the hygroscopic nature and hydrolytic stability of phosphites.

It is yet another object of this invention to provide a process to improve the melt strength of recycled polyolefins.

It is yet another object of this invention to provide an article of manufacture prepared from said polyolefin produced by this invention.

In accordance with the present invention, a composition of matter is formed by combining components comprising:
a) a polyolefin;
b) a first phosphite, which is an arylalkyl diphosphite having a formula, (I)

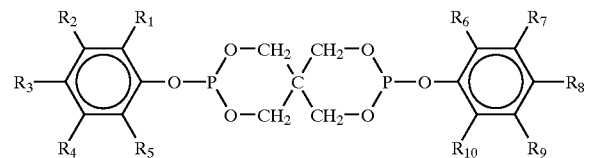

wherein $R^1$, $R^2$, $R^3$, $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical;

c) a second phosphite selected from the group consisting of:
  (i) a second arylalkyl diphosphite of formula (I), wherein $R^1$, $R^2$, $R^3$, $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical, which is different from said first arylalkyl diphosphite and
  (ii) a triarylphosphite having a formula, (II)

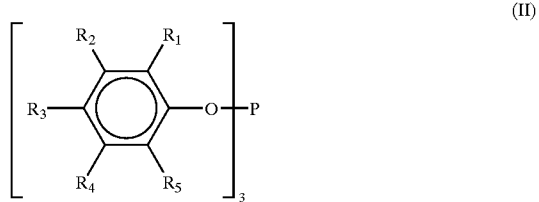

wherein $R^1$, $R^2$, $R^3$, $R^4$, and $R^5$ are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical;

d) a hindered phenol; and
e) water.

A second embodiment of this invention provides a process comprising blending:
a) a polyolefin;
b) a first phosphite, which is an arylalkyl diphosphite having a formula, (I)

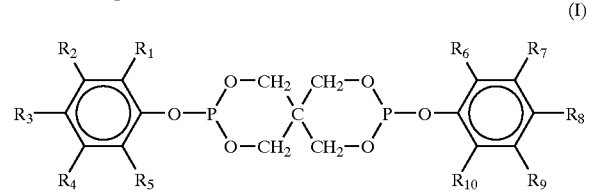

wherein $R^1$, $R^2$, $R^3$, $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical;

c) a second phosphite selected from the group consisting of:
  (i) a second arylalkyl diphosphite of formula (I), wherein $R^1$, $R^2$, $R^3$, $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical, which is different from said first arylalkyl diphosphite and
  (ii) a triarylphosphite having a formula,

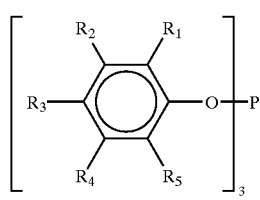

(II)

wherein $R^1$, $R^2$, $R^3$, $R^4$, and $R^5$ are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical;

d) a hindered phenol; and
 e) water.

A third embodiment of this invention provides a process to reduce the hygroscopic nature and to improve the hydrolytic stability of phosphites comprising blending:
 a) a first phosphite, which is an arylalkyl diphosphite having a formula,

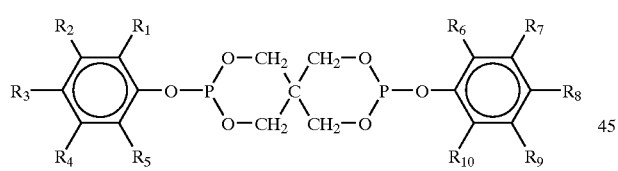

(I)

wherein $R^1$, $R^2$, $R^3$, $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical and
 b) a triarylphosphite having a formula,

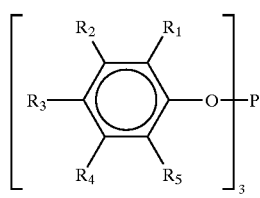

(II)

wherein $R^1$, $R^2$, $R^3$, $R^4$, and $R^5$ are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical.

A fourth embodiment of this invention provides a process to improve the stability of recycled polyolefins comprising blending:
 a) a polyolefin;
 b) a first phosphite, which is an arylalkyl diphosphite having a formula,

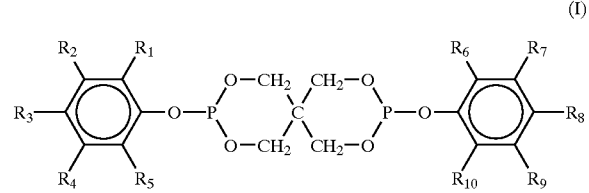

(I)

wherein $R^1$, $R^2$, $R^3$, $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical;

c) a second phosphite selected from the group consisting of:
  (i) a second arylalkyl diphosphite of formula (I), wherein $R^1$, $R^2$, $R^3$, $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical, which is different from said first arylalkyl diphosphite and
  (ii) a triarylphosphite having a formula,

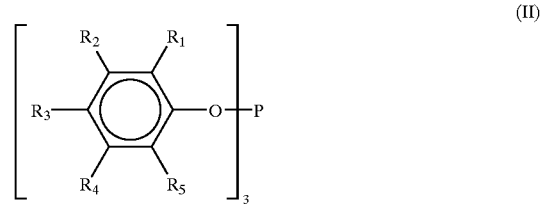

(II)

wherein $R^1$, $R^2$, $R^3$, $R^4$, and $R^5$ are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical.

d) hindered phenol; and
 e) water.

A fifth embodiment of this invention provides an article of manufacture prepared from a polymer produced by a process comprising the step of blending:
 a) a polyolefin;
 b) a first phosphite, which is an arylalkyl diphosphite having a formula,

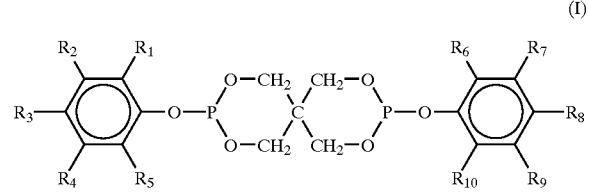

(I)

wherein $R^1$, $R^2$, $R^3$, $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical;

c) a second phosphite selected from the group consisting of:
  (i) a second arylalkyl diphosphite of formula (I), wherein $R^1$, $R^2$, $R^3$, $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical, which is different from said first arylalkyl diphosphite and
  (ii) a triarylphosphite having a formula,

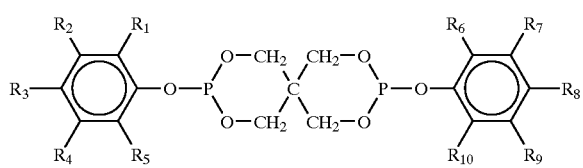

(I)

wherein $R^1$, $R^2$, $R^3$, $R^4$, and $R^5$ are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical;

d) a hindered phenol; and
e) water.

DETAILED DESCRIPTION OF INVENTION

Polyolefins

The term "polyolefin", as used in this invention, includes homopolymers as well as copolymers of olefinic compounds. Usually, said homopolymers are comprised of one mono-1-olefin having about 2 to about 10 carbon atoms per molecule, preferably, about 2 to about 6 carbon atoms per molecule. Exemplary mono-1-olefins, which produce polyolefins with excellent properties, include, but are not limited to, ethylene, propylene, 1-butene, 1-pentene, 1-hexene, and 1-octene. Most preferably, said mono-1-olefin is ethylene due to its ease of use in this invention.

Applicable copolymers comprise at least 2 different mono-1-olefins, a monomer and one or more comonomers, each having from about 2 to about 16 carbon atoms per molecule. Preferably said monomers, which produce polyolefins with excellent properties, include, but are not limited to, ethylene, propylene, 1-butene, 1-pentene, 1-hexene, and 1-octene, most preferably, said mono-1-olefin is ethylene, due to ease of use in the present invention. Exemplary comonomers include, but are not limited to, aliphatic 1-olefins, such as propylene, 1-butene, 1-pentene, 4-methyl-1-pentene, 1-hexene, 1-octene, and other higher olefins and conjugated or non-conjugated diolefins such as 1,3-butadiene, isoprene, piperylene, 2,3-dimethyl-1,3-butadiene, 1,4-pentadiene, 1,7-hexadiene, and other such diolefins and mixtures thereof. Preferably, said copolymer is comprised of ethylene and a higher alpha-olefin comonomer having from about 3 to about 16 carbon atoms per molecule. Propylene, 1-butene, 1-pentene, 1-hexene, 4-methyl-1-pentene, and 1-octene are especially preferred comonomers for use with ethylene due to ease of copolymerization and best resultant copolymer properties. Usually, said polymers are comprised of about 1 to about 20 weight percent comonomers based on the total weight of the polyolefin.

Generally, a polyolefin can be obtained through polymerization of an olefinic compound or compounds by conventional techniques known in the art. For example, a polyolefin can be produced by solution polymerization, slurry polymerization, or gas phase polymerization using conventional equipment and contacting processes. The term "neat" polyolefin, as used in this disclosure, means a polyolefin produced from a process prior to the addition of any additives. Preferably, a polyolefin can be prepared in the presence of an inorganic oxide supported chromium oxide catalyst system, due to its excellent polyolefin production capabilities. As used in this disclosure, the term "support" refers to a carrier for another catalytic component. Any support useful to support catalyst systems can be used. Exemplary inorganic oxide catalyst system supports include, but are not limited to, inorganic oxides, either alone or in combination, phosphated inorganic oxides, and mixtures thereof. Particularly preferred are supports selected from the group consisting of silica, silica-alumina, alumina, fluorided alumina, silated alumina, thoria, aluminophosphate, aluminum phosphate, phosphated silica, phosphated alumina, silica-titania, coprecipitated silica/titania, fluorided/silated alumina, and mixtures thereof Most preferably, the inorganic oxide of an inorganic oxide supported chromium oxide catalyst system is a silica-titania support.

As a result of polymerization by a chromium oxide catalyst system supported on a silica-titania support, a polyolefin can contain a minor amount of titania in the recovered polyolefin. Such polyolefins can contain from about 1 mg/kg to about 10 mg/kg, based on the mass of neat polyolefin, titanium catalyst residue calculated as titanium. It is believed that catalyst residue comprising titanium can contribute to increasing discoloration of polyolefins upon addition of hindered phenols.

Phosphite Additives

Chemical additives frequently are combined with polymers to improve selected physical properties of polymers. For example, antioxidants can be added to improve heat, light, and oxidation stability. As defined in this disclosure, the "stability" of a polymer is an indication or measure of how the polymer is affected by external forces, such as, for example, light, heat, and oxygen, acting on or reacting with the polymer. Stability, in other words, is a measure of changes that can occur in and/or to the polymer.

Hindered phenols are often utilized as a primary antioxidant, however, hindered phenols can discolor polyolefins. Phosphite additives can be utilized to remedy this discoloration problem providing whiteness to polyolefins, and in addition, phosphite additives also can improve the stability of polyolefins. However, some phosphite additives are hygroscopic, and upon absorption of water, phosphites can clump and can be difficult to feed into polymer production processes. Some phosphites are hydrolytically unstable and can react with water, thereby resulting in a lower active phosphite concentration for stabilizing polymers. Furthermore, this hydrolysis reaction can leave moisture and acidic residues in polymers.

Surprisingly, it has been discovered in this invention, that the addition of two specific phosphites to polyolefins can produce a polyolefin having improved color and stability over polyolefins containing only one of the two phosphites. The composition comprises a polyolefin, a first phosphite, which is an arylalkyl diphosphite having a formula,

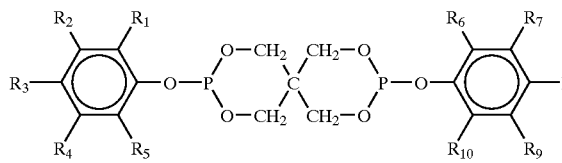

(I)

wherein $R^1$, $R^2$, $R^3$, $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical, and a second phosphite selected from the group consisting of:
  (i) a second arylalkyl diphosphite of formula (I), wherein $R^1$, $R^2$, $R^3$, $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical, which is different from said first arylalkyl diphosphite and
  (ii) a triarylphosphite having a formula,

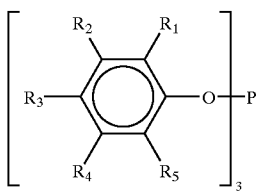

(II)

wherein $R^1$, $R^2$, $R^3$, $R^4$, and $R^5$ are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical.

Preferably, $R^2$, $R^4$, $R^5$, $R^7$, $R^9$, and $R^{10}$ in said first phosphite are hydrogen and $R^1$, $R^3$, $R^6$, and $R^8$ are mixed aliphatic and aromatic organic radicals having from about 1 to about 20 carbon atoms per radical. As used in this disclosure, "mixed aliphatic and aromatic organic radicals" are radicals with both an aliphatic component and an aromatic component. Most preferably, said first phosphite is bis(2,4-dicumylphenyl)pentaerythritol disphosphite since it provides the best resultant polymer color and stability. Bis(2,4-dicumylphenyl) pentaerythritol disphosphite can be obtained commercially from Dover Chemical Corporation under the name Doverphos®S-9228. Depending on the synthesis methods and conditions employed, bis(2,4-dicumylphenyl)pentaerythritol diphosphite can contain up to about 15% of the cage formation as disclosed in U.S. Pat. No. 5,428,086, hereinafter incorporated by reference.

Preferably, $R^2$, $R^4$, $R^5$, $R^7$, $R^9$, and $R^{10}$ in said second arylalkyl diphosphite are hydrogen and $R^1$, $R^3$, $R^6$, and $R^8$ are selected from the group consisting of straight-chained and branched organic radicals having from about 1 to about 20 carbon atoms per radical. Most preferably, said second arylalkyl diphosphite is bis (2,4-di-tert-butylphenyl) pentaerythritol diphosphite since it provides the best resultant polymer stability and color. Bis(2,4-di-tertbutyl) pentaerythritol disphosphite can be obtained commercially from GE Specialty Chemicals under the names Ultranox® 626, which is in powder form, Ultranox®626A, which is in free flowing granular form, and Ultranox® 627A, which is in free flowing form and contains an inorganic neutralizer.

Preferably, $R^2$, $R^4$, and $R^5$ in said triarylphosphite are hydrogen and $R^1$ and $R^3$ are selected from the group consisting of straight-chained and branched organic radicals having from about 1 to about 20 carbon atoms per radical. Said straight-chained and branched organic radicals include, but are not limited to, methyl, tert-butyl, and 1,1-dimethylpropyl. Exemplary triarylphosphites include, but are not limited to, tris-(2,4-di-tert-butylphenyl phosphite; tris-(2-tert-butylphenyl) phosphite; tris-[2-(1,1-dimethylpropyl)-phenyl] phosphite; and tris-[2,4-di-(1,1-dimethylpropyl)-phenyl] phosphite. Most preferably, said triarylphosphite is tris(2,4-di-tert-butylphenyl) phosphite since it can provide improved resultant polymer stability and color. Tris(2,4-di-tert-butylphenyl) phosphite can be obtained commercially from Dover Chemical Corporation under the name Doverphos® S-480.

Said first phosphite and second phosphite can be present in a total phosphite amount within a range of about 100 mg/kg to about 20,000 mg/kg based on the mass of neat polyolefin. Concentrations below 100 mg/kg can be insufficient to improve color and improve stability of said polyolefins, and amounts above 20,000 mg/kg may exceed U.S. Food and Drug Administration limitations, increase costs, and provide no additional benefit to said polyolefins. Preferably, said first phosphite and second phosphite are present in a total phosphite amount within a range of about 100 mg/kg to about 2000 mg/kg based on the mass of the neat polyolefin, most preferably, within a range of 100 mg/kg to 900 mg/kg based on the mass of neat polyolefin. These preferred ranges are optimum since they provide the best polyolefin color and stability at minimum cost.

Generally, said second phosphite can be present in the polymer in an amount within a range of about 2% to about 90% by weight of the total amount of said first and second phosphite added to said neat polyolefin. Concentrations below about 2% by weight based on the total amount of phosphites added can be insufficient to improve color and improve stability of said polyolefins, and amounts above about 90% by weight based on the total amount of phosphites added fail to provide the synergistic effects of improved polyolefin color and stability caused by said first phosphite. Preferably, said second phosphite is present in the polymer in an amount within a range of about 5% to about 75% by weight of the total amount of said first and second phosphite added to said neat polyolefin, most preferably, said second phosphite is present in the polymer in an amount within the range of 10% to 50% of the total amount of said first and second phosphite added to said neat polyolefin. These preferred ranges have been shown to provide the best synergistic effects between said first and said second phosphite to improve polyolefin color and stability.

Hindered Phenols

There are many different hindered phenols which are equally suitable for use in the invention either singly or in combination with each other that are well known to those skilled in the art. The hindered phenol is selected from the group consisting of monophenols, bisphenols, thiobisphenols, polyphenols, hydroxybenzyl aromates, amides of β-(3,5-di-tert-butyl-4-hydroxyphenyl)-propionic acid, esters of β-(3,5-di-tert-butyl-4-hydroxyphenyl)-propionic acid with mono- or polyvalent alcohols, Spiro compounds, and mixtures thereof.

Exemplary monophenols include, but are not limited to, 2,6-di-tert-butyl-4-methylphenol; 2-tert-butyl-4-methoxyphenol; and 4-(hydroxymethyl)-2,6-di-tert-butylphenol.

Exemplary bisphenols include, but are not limited to, 2,2'-methylene-bis-(6-tert-butyl-4-methylphenol); 2,2'-methylene-bis-(6-tert-butyl-4-ethylphenol); 2,2-methylene-bis-[4-methyl-6-(α-methylcyclohexyl)-phenol]; 1,1-bis-(5-tert-butyl-4-hydroxy-2-methyl-phenyl)-butane; 2,2-bis-(5-tert-butyl-4-hydroxy-2-methylphenyl)-butane; 2,2-bis-(3,5-di-tert-butyl-4-hydroxyphenyl)-propane; 1,1,3-tris-(5-tert-butyl-4-hydroxy-2-methylphenyl)-butane; 2,2-bis-(5-tert-butyl-4-hydroxy-2-methylphenyl)-4-n-dodecylmercapto-butane; 1,1,5,5,-tetra-(5-tert-butyl-4-hydroxy-2-methyl-phenyl)-pentane; ethylene glycol-bis-[3,3-bis-(3'-tert-butyl-4'-hydroxyphenyl)-butyrate]; 1,1-bis-(3,5-dimethyl-2-hydroxyphenyl)-3-(n-dodecylthio)-butane; and 4,4'-thio-bis-(6-tert-butyl-3-methylphenol).

Exemplary thiobisphenols include, but are not limited to, 4,4'-thiobis(6-tert-butyl-m-cresol); 1,1 '-thiobis(2-naphthol); and 2,2'-thiobis(4-methyl-6-tert-butylphenol).

Exemplary polyphenols include, but are not limited to, tetrakis(methylene-3-(3,5-di-tert-butyl-4-hydroxyphenyl) propionate)methane; 1,3,5-trimethyl-2,4,6-tris(3,5-di-tert-butyl-4-hydroxybenzyl)-benzene; 1,3,5-tris(3,5-di-tert-butyl-4-hydroxybenzyl)isocyanurate; and tetrakis [methylene (3,5-di-tert-butyl-4-hydroxyhydrocinnamate)] methane.

Exemplary hydroxybenzyl aromates include, but are not limited to, 1,3,5-tri-(3,5-di-tert-butyl-4-hydroxybenzyl)-2,4, 6-trimethylbenzene; 2,2-bis-(3,5-di-tert-butyl-4-hydroxybenzyl)-malonic acid-dioctadecyl ester; 1,3,5-tris-(3,5-di-tert-butyl-4-hydroxybenzyl)-isocyanurate; and 3,5-di-tert-butyl-4-hydroxybenzyl-phosponic acid-diethyl ester.

Exemplary amides of β-(3,5-di-tert-butyl-4-hydroxyphenyl)-propionic acid include, but are not limited to, 1,3,5-tris-(3,5-di-tert-butyl-4-hydroxyphenyl-propionyl-hexahydro-s-triazine and N,N'-di(3,5-di-tert-butyl-4-hydroxyphenyl-propionyl)-hexamethylenediamine.

Exemplary hindered phenols include, but are not limited to, esters of β-(3,5-di-tert-butyl-4-hydroxyphenyl)-propionic acid with mono- or polyvalent alcohols, such as with methanol, octadecanol, 1,6-hexanediol, ethylene glycol, thiodiethylene glycol, neopentyl glycol, pentaerythritol, and tris-hydroxyethyl-isocyanurate.

Exemplary spiro compounds include, but are not limited to, diphenolic spiro-diacetals or spiro-diketals, such as, for example, 2,4,8,10-tetraoxaspiro-[5,5]-undecane substituted in the 3- and 9-position with phenolic radicals, such as 3,9-bis-(3,5-di-tert-butyl-4-hydroxyphenyl)-2,4,8,10-tetraoxaspiro-[5,5]-undecane and 3,9-bis-[ 1,1-dimethyl-2-(3,5-ditert-butyl-4-hydroxyphenyl)-ethyl]-2,4,8,10-tetraoxaspiro-[5,5]-undecane.

Preferably, hindered phenols are selected from the group consisting of tetrakis [methylene (3,5-di-tert-butyl-4-hydroxyhydrocinnamate)]methane; 1,3,5-tri-(3,5-di-tert-butyl-4-hydroxybenzyl)-2,4,6-trimethylbenzene; β-(3,5-di-tert-butyl-4-hydroxyphenyl)-propionic acid-n-octadecyl ester; 2,6-di-tert-butyl-4-methyl-phenol; 3,9-bis-[1,1-dimethyl-2-(3,5-di-tert-butyl-4-hydroxy-phenyl)-ethyl]-2,4, 8,10-tetraoxaspiro-[5,5]-undecane, and mixtures thereof. These preferred hindered phenols provide improved color and stability for polyolefins.

Most preferably, said hindered phenol compound is tetrakis [methylene (3,5-di-tert-butyl-4-hydroxyhydrocinnamate)]methane, since it provides excellent color and stability polyolefin properties. Tetrakis [methylene (3,5-di-tert-butyl-4-hydroxyhydrocinnamate)] methane can be obtained commercially from Ciba-Geigy Corporation as Irganox® 1010.

Generally, the hindered phenol is present in an amount less than about 5000 mg/kg based on the mass of neat polyolefin. Preferably, said hindered phenol is present in an amount within the range of about 1 mg/kg to about 2000 mg/kg based on the mass of neat polyolefin. Most preferably, said hindered phenol is present in an amount within a range of 50 mg/kg to 1000 mg/kg based on the mass of neat polyolefin. Hindered phenol concentrations above 5000 mg/kg can exceed FDA limits and increase production costs, and phenol concentrations below 50 mg/kg can be too low to ensure polyolefin stability.

Water Addition

In accordance with this invention, it has been found that the addition, or presence, of water can improve the color of said polyolefin over polyolefins without water. Generally, water must be present in an amount within a range of about 1 mg/kg to about 5000 mg/kg based on the mass of neat polyolefin. Preferably, water is present in an amount within a range of about 1 mg/kg to about 2000 mg/kg based on the mass of neat polyolefin. Most preferably, water is present in an amount within a range of 1 mg/kg to 1000 mg/kg based on the mass of neat polyolefin. Water concentrations above 5000 mg/kg can cause bubbles in the polyolefin making it commercially unacceptable, while water concentrations less than 1 mg/kg may not improve the color of said polyolefin.

Water added to said polyolefin can have a pH within a range of about 4 to about 10. Preferably, said water can have a pH within a range of about 6 to about 8. A pH lower than 4 can cause production equipment to corrode, and water at a pH higher than 10 can react with the hindered phenol reducing the stability of the polyolefin.

The resulting stabilized polyolefin compositions of this invention comprised of said polyolefin, said first and second phosphite, said hindered phenol, and water may optionally also contain various conventional additives, such as the following:

(1) Antioxidants, including, but not limited to,
  (1.1) Alkylated hydroquinones, such as, for example, 2,6-di-t-butyl-4-methoxyphenol; 2,5-di-t-butyl-hydroquinone; 2,5-di-6-amyl-hydroquinone; and 2,6-diphenyl-4-octadecyloxyphenol;
  (1.2) Hydroxylated thiodiphenyl ethers, such as, for example, 2,2'-thio-bis-(6-t-butyl-4-methylphenol); 2,2'-thio-bis-(4-octylphenol); 4,4'-thio-bis-(6-t-butyl-3-methylphenol); and 4,4'-thio-bis-(6-t-butyl-2-methylphenol);
  (1.3) Benzyl compounds, such as, for example, 1,3,5-tris-(3,5-di-t-butyl-4-hydroxybenzyl)-2,4,6-trimethylbenzene; bis(3,5-di-t-butyl-4-hydroxybenzyl)sulfide; isooctyl-3,5-di-t-butyl-4-hydroxybenzyl-mercapto-acetate; bis-(4-t-butyl-3-hydroxy-2,6-dimethylbenzyl)dithiolterephthalate; 1,3,5-tris(3,5-di-t-butyl-4-hydroxybenzyl) isocyanurate; 1,3,5-tris(4-t-butyl-3-hydroxy-2,6-dimethylbenzyl)isocyanurate; dioctadecyl-3,5-di-t-butyl-4-hydroxybenzyl-phosphonate; calcium salt of monoethyl 3,5-di-t-butyl-4-hydroxybenzylphosphonate; and 1,3,5-tris-1,3,5-dicyclohexyl-4-hydroxybenzyl)isocyanurate;

- (1.4) Acylaminophenols, such as, for example, 4-hydroxy-lauric acid anilide; 4-hydroxy-stearic acid anilide; 2,4-bis-octylmercapto-6-(3,5-t-butyl-4-hydroxy-anilino)-s-triazine; and octyl-n-(3,5-di-t-butyl-4-hydroxyphenyl)-carbamate;
- (1.5) Esters of β-(5-t-butyl-4-hydroxy-3-methyl-phenyl)-propionic acid with monohydric or polyhydric alcohols, such as, for example, methanol; diethyleneglycol; octadecanol; triethyleneglycol; 1,6-hexanediol; pentaerythritol; neopentylglycol; tris-hydroxyethyl isocyanurate; thiodiethyleneglycol; N,N'-bis(hydroxyethyl)oxalic acid diamide; and di-hydroxyethyl oxalic acid diamide;

(2) UV absorbers and light stabilizers
- (2.1) 2-(2'-Hydroxyphenyl)-benzotriazoles, such as, for example, the 5'-methyl-, 3',5'-di-t-butyl-, 5'-t-butyl-, 5'-(1,1,3,3-tetramethylbutyl)-, 5-chloro-3'-, 5'-di-t-butyl-, 5-chloro-3'-t-butyl-5'-methyl-, 3'-sec-butyl-5'-t-butyl, 4'-octoxy, 3,5'-di-t-amyl-, and 3,5'-bis-(α,α-dimethylbenzyl)-derivatives;
- (2.2) 2-Hydroxy-benzophenones, such as, for example, the 4-hydroxy-, 4-methoxy-, -octoxy-, 4-decyloxy-, 4-dodecyloxy-, 4-benzyloxy-, 4,2',4'-trihydroxy-, and 2'-hydroxy-4,4'-dimethoxy-derivatives.
- (2.3) Esters of substituted and unsubstituted benzoic acids, such as, for example, phenyl salicylate; 4-t-butyl-phenyl-salicylate; octylphenyl salicylate; dibenzoyl-resorcinol; bis-(4-t-butylbenzoyl)-resorcinol; benzoylresorcinol; 2,4-di-t-butyl-phenyl-3,5-di-t-butyl-4-hydroxybenzoate; and hexadecyl-3,5-di-t-butyl-4-hydroxybenzoate;
- (2.4) Acrylates, such as, for example, α-cyano-β,β-diphenylacrylic acid ethyl ester or isooctyl ester; α-carbomethoxy-cinnamic acid methyl ester; α-cyano-β-methyl-p-methoxy-cinnamic acid methyl ester or butyl ester; α-carbomethoxy-p-methoxy-cinnamic acid methyl ester; and N-(β-carbomethoxy-β-cyano-vinyl)-2-methyl-indoline.
- (2.5) Nickel compounds, such as, for example, nickel complexes of 2,2'-thio-bis-[4-(1,1,3,3-tetramethylbutyl)-phenol], such as the 1:1 or 1:2 complex, optionally with additional ligands such as n-butylamine, triethyanolamine or N-cyclohexyl-di-ethanolamine, nickel dibutyl-dithiocarbamate, nickel salts of 4-hydroxy-3,5-di-t-butylbenzylphosphonic acid monoalkyl esters, such as of the methyl, ethyl or butyl ester, nickel complexes of ketoximes such as of 2-hydroxy-4-methyl-pentyl undecyl ketoxime, and nickel complexes of 1-phenyl-4-lauroyl-5-hydroxy-pyrazol, optionally with additional ligands.
- (2.6) Sterically hindered amines, such as, for example bis-(2,2,6,6-tetramethylpiperidyl)-sebacate; bis-(1,2,2,6,6-pentamethylpiperidyl)-sebacate; n-butyl-3,5-di-t-butyl-4-hydroxybenzyl malonic acid; bis-(1,2,2,6,6-pentamethylpiperidyl)ester; condensation product of 1-hydroxyethyl-2,2,6,6-tetramethyl-4-hydroxy-piperidine and succinic acid; condensation product of N,N'-(2,2,6,6-tetramethylpiperidyl)-hexamethylendiamine and 4-t-octylamino-2,6-dichloro-1,3,5-s-triazine; tris-(2,2,6,6-tetramethylpiperidyl)-nitrilotriacetate; tetrakis(2,2,6,6-tetramethyl-4-piperidyl)-1,2,3,5-butane-tetracarbonic acid; 1,1'-(1,2-ethanediyl)-bis-(3,3,5,5-tetramethylpiperazinone). Such amines include hydroxylamines derived from hindered amines, such as di-(1-hydroxy-2,2,6,6-tetramethylpiperidin-4-yl) sebacate; 1-hydroxy-2,2,6,6-tetramethyl-4-benzoxypiperidine; 1-hydroxy-2,2,6,6-tetramethyl-4 (3,5-di-t-butyl-4-hydroxyhydrocinnamoyloxy) piperidine; and N-(1-hydroxy-2,2,6,6-tetramethylpiperidin-4-yl)-ε-caprolactam.
- (2.7) Oxalic acid diamides, such as, for example, 4,4'-di-octyloxy-oxanilide; 2,2'-di-octyloxy-5,5-di-t-butyl-oxanilide; 2,2'-di-dodecyloxy-5,5'-di-t-butyl-oxanilide, 2-ethoxy-2'-ethyl-oxanilide; N,N'-bis(3-dimethylaminopropyl)-oxalamide; 2-ethoxy-5-t-butyl-2'-ethoxyanilide and its mixture with 2-ethoxy-2'-ethyl-5,4'-di-t-butyloxanilide and mixtures of o-methoxy and p-methoxy as well as of o-ethoxy and p-ethoxy disubstituted oxanilides.

(3) Metal deactivators, such as, for example, N,N'-diphenyloxalic acid diamide; N-salicylal-N'-salicyloylhydrazine; N,N'-bis-salicyloylhydrazine; N,N'-bis-(3,5-di-t-butyl-4-hydroxyphenylpropionyl)-hydrazine; salicyloylamino-1,2,4-triazole; bis-benzylidene-oxalic acid dihydrazide.

(4) Phosphites and phosphonites, such as, for example, triphenyl phosphite; diphenylalkyl phosphites; phenyl-dialkyl phosphites; tris(nonyl-phenyl) phosphite; trilauryl phosphite; trioctadecyl phosphite; distearyl pentaerythritol diphosphite; tris(2,4-di-t-butyl-phenyl) phosphite; diisodecyl pentaerythritol diphosphite; bis (2,4-di-t-butylphenyl)pentaerythritol diphosphite; tristearyl sorbitol triphosphite; and tetrakis(2,4-di-t-butylphenyl) 4,4'-biphenylene diphosphonite.

(5) Peroxide scavengers, such as, for example, esters of β-thiodipropionic acid, for example, the lauryl, stearyl, myristyl or tridecyl esters, mercaptobenzimidazole or the zinc salt of 2-mercaptobenzimidazole, zinc-dibutyl-dithiocarbamate, dioctadecyldisulfide, pentaerythritol-tetrakis(β-dodecyl-mercapto)-propionate.

(6) Polyamide stabilizers, such as, for example, copper salts in combination with iodides and/or phosphorus compounds and salts of divalent manganese.

(7) Basic co-stabilizers, such as, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, barium stearate, magnesium stearate, sodium ricinoleate, potassium palmirate, antimony pyrocatecholate and zinc pyrocatecholate.

(8) Nucleating agents, such as, for example, 4-t-butyl-benzoic acid, adipic acid, and dephenylacetic acid.

(9) Fillers and reinforcing agents, such as, for example, calcium carbonate, silicates, glass fibers, asbestos, talc, kaolin, mica, barium sulfate, metal oxides and hydroxides, carbon black, and graphite.

(10) Aminoxy propionate derivatives, such as, for example, methyl-3-[N,N-dibenzylaminoxy] propanoate; ethyl-3-[N,N-dibenzylaminoxy] propanoate; 1,6-hexamethylene-bis[3-(N,N-dibenzylaminoxy)propanoate]; methyl-[2-(methyl)-3-(N,N-dibenzylaminoxy)propionate]; octadecyl-3-[N,N-dibenzyl-aminoxy]propanoic acid; tetrakis[N,N-dibenzylaminoxy)ethyl carbonyl oxymethyl]methane; octadecyl-3-[N,N-diethylaminoxy]propanoate; 3-[N,N-dibenzylaminoxypropanoic acid potassium salt; and 1,6-hexamethylene-bis[3-(N-allyl-N-dodecyl aminoxy)propanoate].

(11) Other additives, such as, for example, plasticizers, lubricants, emulsifiers, pigments, optical brighteners, flame-proofing agents, antistatic agents, blowing agents and thiosynergists such as dilaurylthiodipropionate or distearylthiodipropionate.

(12) Other additives, such as, for example, oxazaphospholidines, may additionally or alternatively be present.

Polyolefin Applications

To produce a polyolefin with improved color, stability, and melt strength after recycling, a process is employed comprising blending the following components:

a) a polyolefin;
b) a first phosphite, which is an arylalkyl diphosphite having a formula,

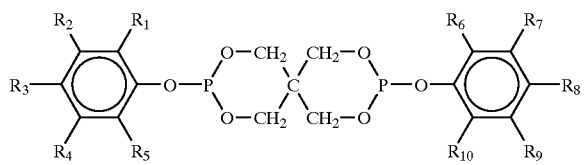

(I)

wherein $R^1$, $R^2$, $R^3$, $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical;

c) a second phosphite selected from the group consisting of:
   (i) a second arylalkyl diphosphite of formula (I), wherein $R^1$, $R^2$, $R^3$, $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms, which is different from said first arylalkyl diphosphite and
   (ii) a triarylphosphite having a formula,

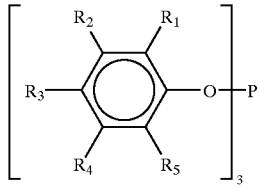

(II)

wherein $R^1$, $R^2$, $R^3$, $R^4$, and $R^5$ are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical;

d) a hindered phenol; and
e) water.

The combination of said first phosphite, said second phosphite and water with said polyolefin improves color over polyolefins produced without water or a second phosphite. In addition, polyolefin stability is improved by the use of the combination of said first phosphite and said second phosphite.

Furthermore, when the first phosphite and the second phosphite are added to said polyolefin, recycled polyolefins or reworked polyolefins have improved melt strength through two regrind passes. As defined in this disclosure, "recycled polyolefins" or "reworked polyolefins" are polyolefins that have been reground or pelletized after having been previously processed by molding, extrusion or other applications. "Regrind passes" is defined as the number of times the polyolefin is ground into pieces to be reused in new applications. Melt strength is a measure of the strength of the plastic while in the molten state.

Any of the additives herein discussed, excluding water, can be combined with said polyolefins according to any method known in the art and at any time after formation of said polyolefin in production processes, or prior to, during, or after fabrication into articles. While phosphite additives are typically incorporated into polyolefins prior to fabrication into articles, it is also possible to apply the phosphite additives by a topical application to the finished articles. Exemplary methods of combining said phosphite additives with said polyolefin, include, but are not limited to, mixing, pelletizing, extruding, and mixtures thereof. The phosphite additives can be preblended together and then combined with said polyolefin, or said phosphite additives can be combined individually with said polyolefin. Said phosphite additives may be in solid form, solution, or a slurry. Said polyolefin can be in any form, such as, for example, fluff, powder, granulate, pellet, solution, slurry, and/or emulsion.

Water can be combined with a polyolefin prior to, during, and/or after fabrication of the polyolefin into articles. Water can be added by any method known in the art including water spray or steam injection systems. Preferably, water at ambient temperature is routed via a pumping system to the throat of an extruder, and most preferably, water is added via an atomization spray system. These methods are preferred since uniform water addition can be obtained.

Another embodiment of this invention is a process to reduce the hygroscopic nature and to improve the hydrolytic stability of phosphites comprising blending:

(i) a first phosphite, which is an arylalkyl diphosphite having a formula,

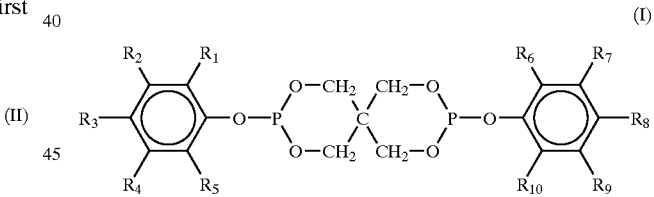

(I)

wherein $R^1$, $R^2$, $R^3$, $R^4$, R $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical and (ii) a triarylphosphite having a formula,

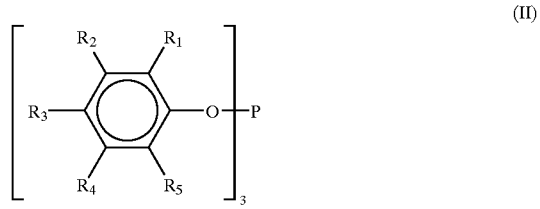

(II)

wherein $R^1$, $R^2$, $R^3$, $R^4$, and $R^5$ are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical.

Some triarylphosphite are hydrolytically resistant while said arylalkyl diphosphites can be hydrolytically prone. When said arylalkyl diphosphites and said triarylphosphites are combined, the phosphite blend has a reduced hygroscopic nature and has improved hydrolytic stability.

A further embodiment of this invention is an article of manufacture prepared from a polymer produced by a process comprising blending:

a) a polyolefin;
b) a first phosphite, which is an arylalkyl diphosphite having a formula,

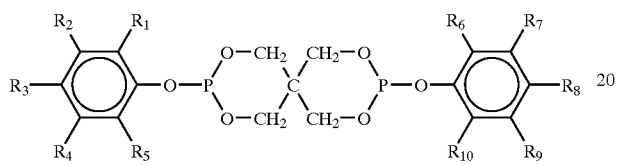

(I)

wherein $R^1$, $R^2$, $R^3$, $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical;

c) a second phosphite selected from the group consisting of:
  (i) a second arylalkyl diphosphite of formula (I), wherein $R^1$, $R^2$, $R^3$, $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical, which is different from said first arylalkyl diphosphite and
  (ii) a triarylphosphite having a formula, $$\left[ \begin{array}{c} R_2 \quad R_1 \\ \\ R_3 - \!\!\!\begin{array}{c}\phantom{x}\end{array}\!\!\!- O \\ R_4 \quad R_5 \end{array} \right]_3 P \qquad (II)$$

wherein $R^1$, $R^2$, $R^3$, $R^4$, and $R^5$ are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical;

d) a hindered phenol; and
e) water.

Said article of manufacture can be produced by any means known in the art, such as, but not limited to, extrusion, blow molding, injection molding, and thermoforming.

EXAMPLES

The following examples are provided to assist a person skilled in the art with further understanding of this invention. These examples are intended to be illustrative of the invention but are not meant to be construed as limiting the reasonable scope of the invention.

Chemical compounds utilized in these examples are summarized below:

A. bis(2,4-dicumylphenyl) pentaerythritol diphosphite, commercially available as Doverphos® S-9228, which is a registered trademark of Dover Chemical Company;

B. tris-(2,4-di-tert-butylphenyl) phosphite commercially obtained as DoverPhos® S-480, which is a registered trademark of Dover Chemical Company;

C. tris(2,4-di-tert-butylphenyl)phosphite, commercially available as Irgafos® 168, which is a registered trademark of Ciba Specialty Chemicals Company;

D. bis(2,4-di-t-butylphenyl) pentaerythritol diphosphite, commercially available as Ultranox® 626, which is a registered trademark of General Electric Co.;

E. bis(2,4-di-t-butylphenyl) pentaerythritol diphosphite, commercially available as Ultranox® 627A, which is a registered trademark of General Electric Co.;

F. bis(2,4-di-t-butylphenyl) pentaerythritol diphosphite, commercially available as Alkanox® P-24, which is a registered trademark of Great Lakes Chemical Co.;

G. tetrakis [methylene (3,5-di-tert-butyl-4-hydroxyhydrocinnamate)] methane, a hindered phenol, commercially available as Anox® 20, which is a registered trademark of Great Lakes Chemical Company;

H. tetrakis [methylene (3,5-di-tert-butyl-4-hydroxyhydrocinnamate)] methane, a hindered phenol, commercially available as Irganox® 1010, which is a registered trademark of Ciba Specialty Chemicals Company;

I. ZHT-4D, an acid scavenger, commercially available from Kyowa Chemical Industry Company;

H. DHT-4A is an acid scavenger produced by Kyowa Chemical Industry Company.

Example I 700 mg of Anox 20 per kg of polyethylene and 300 mg of ZHT-4D per kg of polyethylene were dry blended together with varying amounts of Doverphos S-9228 and Doverphos S-480 for about two minutes to make different stabilization packages.

A total package of 1300 mg of Doverphos S-9228, Doverphos S-480, Anox 20, and ZHT-4D were added per kg of polyethylene during an extruding process producing a stabilized polyethylene composition. A twin screw extruder with four separate temperature zones was utilized. Zone one was at 190° C., zone two was at 210° C., zone three was at 220° C., and zone 4 was at 215° C. The extruder screws rotated at 25 revolutions per minute (rpm). After extruding said stabilized polyethylene composition, each strand was pelletized and placed in a sample carton.

Samples of each stabilized polyethylene composition were analyzed by a Hunter Lab D25 Optical Sensor purchased from Hunter Associate Laboratory, Inc. This analysis provided Hunter "a" and Hunter "b" color values for each sample. Hunter "a" value indicates color variation between red and green. Negative Hunter "a" values indicate greenness; positive Hunter "a" values indicate redness. Hunter "b" value indicates color variation between blue and yellow. Negative Hunter "b" numbers indicate blueness; positive Hunter "b" values indicate yellowness. Hunter "L" value indicates color variation between white and black. Negative Hunter "L" values indicate blackness; positive Hunter "L" values indicate whiteness.

Hunter "a", "b", and "L" values were converted to a Phillips Polyethylene Color Number (PE#) by the formula:

PE#=L(0.0382L−0.056a−0.3374b)

A higher PE# is an indicator of whiter polyethylene.

The data presented in Table I below show the theoretical PE# if a linear relationship was assumed between the PE# and the amount of Doverphos S-9228 and Doverphos S-480 blended with the polyethylene. To obtain the linear relationship, two test runs were completed. In the first test, 300 mg/kg of Doverphos S-9228 was added per kg of polyethylene, and in the second test, 300 mg/kg of Doverphos S-480 per kg of polyethylene was added. From these two data points, the PE#s for various blends of Doverphos S-9228 and Doverphos S-480 were predicted.

TABLE I

| Run # | Doverphos S-9228 (bis(2,4-dicumylphenyl) pentaerythritol diphosphite) (mg/kg) | Doverphos S-480 (tris(2,4-di-tert-butylphenyl) phosphite) (mg/kg) | PE # |
|---|---|---|---|
| 100 | 300 | 0 | 285.8 |
| 110 | 225 | 75 | 282.8 |
| 120 | 150 | 150 | 280.0 |
| 130 | 75 | 225 | 276.8 |
| 140 | 0 | 300 | 274.0 |

Based on this theoretical, linear relationship, the PE# should decrease as the percentage of Doverphos S-480 added to the polyethylene is increased.

The data shown in Table II present the PE# as the concentration of Doverphos S-480 is increased.

TABLE II

| Run # | Doverphos S-9228 (bis(2,4-dicumylphenyl) pentaerythritol diphosphite) (mg/kg) | Doverphos S-480 (tris(2,4-di-tert-butylphenyl) phosphite) (mg/kg) | PE # |
|---|---|---|---|
| 200 | 300 | 0 | 285.8 |
| 210 | 225 | 75 | 291.8 |
| 220 | 150 | 150 | 292.0 |
| 230 | 75 | 225 | 287.5 |
| 240 | 0 | 300 | 274.0 |

Surprisingly, the data clearly show in Table II that the blend on of Doverphos S-9228 and Doverphos S-480, rather than the PE# as theoretically predicted, significantly improved the of the polyethylene. In Run 220, equal portions of Doverphos S9228 and Doverphos S-480 produced the most white polyethylene product. Furthermore, since Doverphos S-480 is considerably more economical than Doverphos S-9228, this blend represents a significant financial savings to the polyolefin producer.

Example 2

The indicated phosphites and phosphite blends in Table III were tested to determine the percentage weight gain due to moisture absorption over a period of 7 days.

The percentage weight gain was calculated by initially weighing 2000 mg of a particular phosphite or blend of phosphites. Then, the phosphite or phosphite blend was placed in a humidity oven manufactured by Blue M (Model# POM-75700-1). The humidity oven was operated at 45° C. and 95% relative humidity. After each day, the phosphite sample was weighed. The percentage weight gain was calculated by the following formula:

$$\% \text{ Weight Gain} = \frac{(\text{Weight after time in oven}) - (\text{Initial Weight})}{(\text{Initial Weight})}$$

The data are tabulated below in Table III.

TABLE III

| Run | Additive Package | % Weight Gain - Each Day | | | | | | |
|---|---|---|---|---|---|---|---|---|
| | | 1 | 2 | 3 | 4 | 5 | 6 | 7 |
| 300 | A | 18 | 23 | 29 | 33 | 36 | 37 | 41.5 |
| 310 | B | 5 | 10 | 17 | 27 | 31 | 34.5 | 38 |
| 320 | C | 11.5 | 12 | 17 | 17.2 | 15.5 | 15.7 | 15.9 |
| 330 | D | 4.8 | 4 | 5.5 | 7.5 | 6 | 5.4 | 6.0 |

Additive Packages:
A: 71 wt % Anox 20 and 29 wt % Alkanox P-24;
B: 70 wt % Irganox 1010; 23 wt % Ultranox 626; 7 wt % of ZHT-4D
C: 100 wt % DoverPhos S-9228;
D: 50 wt % DoverPhos S-9228; 50 wt % DoverPhos S-480

As can be seen from Run 330 in Table III, the combination of Doverphos S-9228 and Doverphos S-480 had an average moisture absorption of 6% over a period of 7 days while Doverphos S-9228 used alone in Test Run 320 had an average moisture absorption of almost 16% over a period of 7 days. The addition of the Doverphos S-480 to Doverphos S-9228 greatly reduced the moisture absorption of Doverphos S-9228.

Example 3

The indicated amounts of phosphites shown in Table IV were added to polyethylene via the same extruding process as discussed in Example 1. In addition to the phosphites, 1000 mg/kg of distilled water was added during the extruding process. The stabilized polyethylene composition was then reground four times, i.e. initial extrusion, followed by four (4) more repeat steps of regrind and extrusion. After each regrind pass, the melt strength of the polyethylene was tested to observe the effect of the phosphite additives. Melt strength was determined by measuring the time a parison hangs on a die before it falls off the die. Longer times indicate higher melt strength. A Krupp Kautex Model KB25 blow molding machine was utilized to extrude approximately 2400 grams of polyethylene through a 4.5 inch diameter diverging tooling with a die gap of 0.089 inches. The data are presented in Table IV.

TABLE IV

| Run | Irganox 1010 | Ultranox 627A | Dover S-9228 | Irgafos 168 | ZHT-4D | Melt Strength (sec) | | |
|---|---|---|---|---|---|---|---|---|
| | | | | | | Pass 0 | Pass 1 | Pass 2 |
| 400 | 700 | 500 | 0 | 0 | 0 | 82 | 103 | 180 |
| 410 | 900 | 500 | 900 | 0 | 400 | 26 | 39 | 61 |
| 420 | 900 | 0 | 900 | 0 | 400 | 54 | 57 | 102 |
| 430 | 900 | 0 | 900 | 300 | 400 | 35 | 42 | 49 |

As shown in Run 410, the combination of Ultranox 627A and Doverphos S-9228 significantly improved the melt strength stability of the stabilized polyethylene composition through two regrind passes as compared to Run 400 where Doverphos S-9228 was not utilized. In addition, as shown in Run 430, the combination of Irgafos 168 and Doverphos S-9228 also significantly improved the melt strength stability of the stabilized polyethylene composition through two regrind passes over Run 420 where Irgafos 168 was not used.

Example IV

A particular phosphite or phosphite blend, a hindered phenol, and varying amounts of distilled water were added to polyethylene prior to the same extruding process discussed in Example 1, in order to determine the effect of water addition on PE#.

TABLE V

| Run 500 | Water (ppm) | 0 | 200 | 400 | 800 | 1000 |
|---|---|---|---|---|---|---|
|  | PE # | 99.9 | 181.6 | 216.1 | 268.1 | 236.4 |
| Run 510 | Water (ppm) | 0 | 200 | 400 | 800 | 1000 |
|  | PE # | 190.5 | 262.8 | 276.1 | 289.4 | 283.9 |
| Run 520 | Water (ppm) | 0 | 200 | 400 | 800 | 1000 |
|  | PE # | 190.5 | 279.9 | 295.6 | 296.7 | 292.8 |

Run 500: 500 ppm of Ultranox 627 and 700 ppm Anox 20;
Run 510: 1000 ppm Doverphos S-9228, 700 ppm Anox 20, and 100 ppm ZHT-4D;
Run 520: 800 ppm Doverphos S-9228, 200 ppm S-480, 700 ppm Anox 20, and 100 ppm ZHT-4D.
Note: All amounts (mg/kg) based on mg of additive per kg of neat polyethylene.

The data showed that water addition significantly improved the color of the polyethylene over the addition of phosphites alone.

while this invention has been described in detail for the purpose of illustration, it is not to be construed as limited thereby but is intended to cover all changes and modifications within the spirit and scope thereof.

What is claimed is:

1. A composition formed by combining components comprising:

a) a polyolefin;
    b) a first phosphite, which is an arylalkyl diphosphite having a formula,

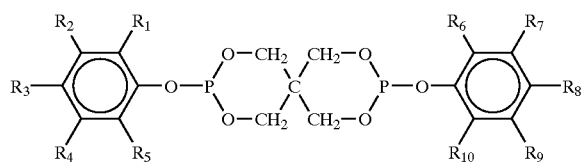

(I)

wherein $R^1$, $R^2$, $R^3$, $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical;

c) a second phosphite selected from the group consisting of:
        (i) a second arylalkyl diphosphite of formula (I), wherein $R^1$, $R^2$, $R^3$, $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical, which is different from said first arylalkyl diphosphite and
        (ii) a triarylphosphite having a formula,

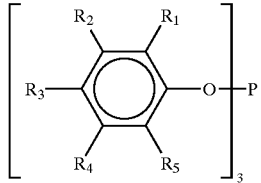

(II)

wherein $R^1$, $R^2$, $R^3$, $R^4$, and $R^5$ are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical;

d) a hindered phenol; and
    e) water.

2. A composition according to claim 1 wherein said polyolefin is selected from the group consisting of homopolymers of one mono-1-olefin having from about 2 to about 10 carbon atoms per molecule and copolymers of at least 2 different mono-1-olefins having about 2 to about 10 carbon atoms per molecule.

3. A composition according to claim 2 wherein said polyolefin is an ethylene homopolymer.

4. A composition according to claim 2 wherein said polyolefin is a copolymer of ethylene and a higher alpha-olefin comonomer having from about 3 to about 16 carbon atoms per molecule.

5. A composition according to claim 2 wherein said comonomer is present in said polyolefin within a range of about 1 to about 20 weight percent comonomer based on the total weight of the copolymer.

6. A composition according to claim 1 wherein said polyolefin is prepared in the presence of an inorganic oxide supported chromium oxide catalyst system.

7. A composition according to claim 6 wherein said inorganic oxide of said inorganic oxide supported chromium catalyst system is a silica-titania support.

8. A composition according to claim 7 wherein said polyolefin contains from about 1 mg/kg to about 10 mg/kg, based on the mass of the neat polyolefin, titania catalyst residue calculated as titanium.

9. A composition according to claim 1 wherein $R^2$, $R^4$, $R^5$, $R^7$, $R^9$, and $R^{10}$ in said first phosphite are hydrogen and $R^1$, $R^3$, $R^6$, and $R^8$ are mixed aliphatic and aromatic organic radicals having from about 1 to about 20 carbon atoms per radical.

10. A composition according to claim 9 wherein said first phosphite is bis(2,4-dicumylphenyl)pentaerythritol disphosphite.

11. A composition according to claim 1, wherein $R^2$, $R^4$, $R^5$, $R^7$, $R^9$, and $R^{10}$ in said second arylalkyl diphosphite are hydrogen and $R^1$, $R^3$, $R^6$, and $R^8$ are selected from the group consisting of straight-chained and branched organic radicals having from about 1 to about 20 carbon atoms per radical.

12. A composition according to claim 11 wherein said second arylalkyl diphosphite is bis (2,4-di-tert-butylphenyl) pentaerythritol diphosphite.

13. A composition according to claim 1, wherein $R^2$, $R^4$, and $R^5$ in said triarylphosphite are hydrogen and $R^1$ and $R^3$ are selected from the group consisting of straight-chained and branched organic radicals having from about 1 to about 20 carbon atoms per radical.

14. A composition according to claim 13 wherein said triarylphosphite is tris(2,4-di-tert-butylphenyl) phosphite.

15. A composition according to claim 1 wherein said first phosphite and said second phosphite are present in a total phosphite amount within a range of about 100 mg/kg to about 20,000 mg/kg based on the mass of the neat polyolefin.

16. A composition according to claim 15 wherein said first phosphite and said second phosphite are present in a total phosphite amount within a range of 100 mg/kg to 900 mg/kg based on the mass of the neat polyolefin.

17. A composition according to claim 15 wherein said second phosphite is present in an amount within a range of about 2% to about 90% by weight of the total amount of said first and said second phoshite added to said neat polyolefin.

18. A composition according to claim 17 wherein said second phosphite is present in an amount within a range of about 10% to about 50% by weight of the total amount of said first and said second phoshite added to said neat polyolefin.

19. A composition according to claim 1 wherein said hindered phenol is selected from the group consisting of monophenols, bisphenols, thiobisphenols, polyphenols, hydroxybenzyl aromates, amides of β-(3,5-di-tert-butyl-4-hydroxyphenyl)-propionic acid, esters of β-(3,5-di-tert-butyl-4-hydroxyphenyl)-propionic acid with mono- or polyvalent alcohols, spiro compounds, and mixtures thereof.

20. A composition according to claim 19 wherein said hindered phenol is selected from the group consisting of tetrakis(methylene 3-(3,5-di-t-butyl-4-hydroxyphenyl) propionate)methane; 1,3,5-tri-(3,5-di-tert-butyl-4-hydroxybenzyl)-2,4,6-trimethylbenzene; β-(3,5-di-tert-butyl-4-hydroxyphenyl)-propionic acid-n-octadecyl ester; 2,6-di-tert-butyl-4-methyl-phenol; 3,9-bis-[1,1-dimethyl-2-(3,5-di-tert-butyl-4-hydroxy-phenyl)-ethyl]-2,4,8,10-tetraoxaspiro-[5,5]-undecane; and mixtures thereof.

21. A composition according to claim 20 wherein said hindered phenol is tetrakis[methylene (3,5-di-tert-butyl-4-hydroxyhydrocinnamate)]methane.

22. A composition according to claim 1 wherein said hindered phenol is present in an amount less than about 5000 mg/kg based on the mass of the neat polyolefin.

23. A composition according to claim 22 wherein said hindered phenol is present in an amount within the range of 50 mg/kg to 1000 mg/kg based on the mass of the neat polyolefin.

24. A composition according to claim 1 wherein said water is present in an amount within the range of about 1 mg/kg to about 5000 mg/kg based on the mass of the neat polyolefin.

25. A composition matter according to claim 24 wherein said water is present in an amount within the range of 1 mg/kg to 1000 mg/kg based on the mass of the neat polyolefin.

26. A composition according to claim 1 wherein said water has a pH within a range of about 4 to about 10.

27. A composition according to claim 26 wherein said water has a pH within a range of about 6 to about 8.

28. A composition formed by combining components comprising:
a) a polyolefin selected from the group consisting of homopolymers of one mono-1-olefin having from about 2 to about 10 carbon atoms per molecule and copolymers of at least 2 different mono-1-olefins having about 2 to about 10 carbon atoms per molecule;

b) a first phosphite, which is an arylalkyl diphosphite having a formula,

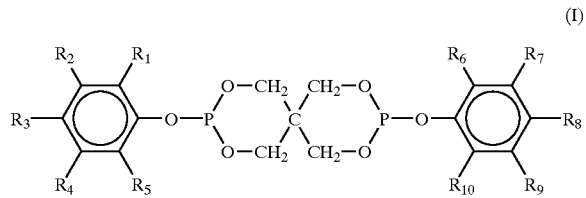

(I)

wherein $R^2$, $R^4$, $R^5$, $R^7$, $R^9$, and $R^{10}$ in said first phosphite are hydrogen and $R^1$, $R^3$, $R^6$, and $R^8$ are mixed aliphatic and aromatic organic radicals having from about 1 to about 20 carbon atoms per radical;

c) a second phosphite selected from the group consisting of
(i) a second arylalkyl diphosphite of formula (I), wherein $R^2$, $R^4$, $R^5$, $R^7$, $R^9$, and $R^{10}$ in said second arylalkyl diphosphite are hydrogen and $R^1$, $R^3$, $R^6$, and $R^8$ are selected from the group consisting of straight-chained and branched organic radicals having from about 1 to about 20 carbon atoms per radical and
(ii) a triarylphosphite having a formula,

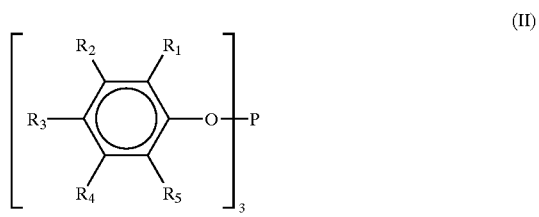

(II)

wherein $R^2$, $R^4$, and $R^5$ in said triarylphosphite are hydrogen and $R^1$ and $R^3$ are selected from the group consisting of straight-chained and branched organic radicals having from about 1 to about 20 carbon atoms per radical;

d) a polyphenol in an amount within the range of about 50 mg/kg to about 5000 mg/kg based on the mass of said neat polyolefin; and e) water in an amount within the range of 1 mg/kg to about 5000 mg/kg based on the mass of said neat polyolefin.

29. A process comprising blending:
a) a polyolefin;
b) a first phosphite, which is an arylalkyl diphosphite having a formula,

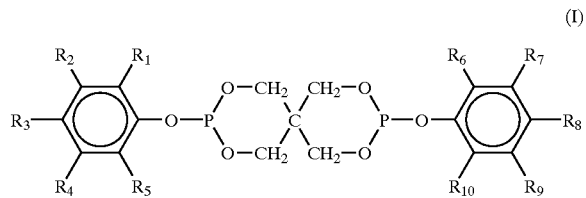

(I)

wherein $R^1$, $R^2$, $R^3$, $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical;

c) a second phosphite selected from the group consisting of:
  (i) a second arylalkyl diphosphite of formula (I), wherein $R^1$, $R^2$, $R^3$, $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical, which is different from said first arylalkyl diphosphite and
  (ii) a triarylphosphite having a formula,

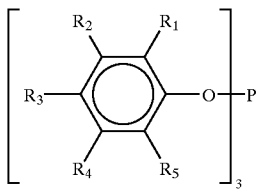
(II)

wherein $R^1$, $R^2$, $R^3$, $R^4$, and $R^5$ are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical;

d) a hindered phenol; and
e) water.

30. A process according to claim 29 wherein said blending procedure is selected from the group consisting of mixing, pelletizing, extruding, and mixtures thereof.

31. A process to improve the melt strength upon recycle of a polyolefin comprising blending:
a) a polyolefin;
b) a first phosphite, which is an arylalkyl diphosphite having a formula,

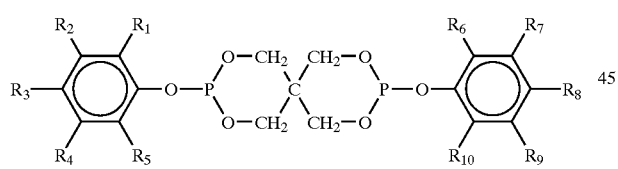
(I)

wherein $R^1$, $R^2$, $R^3$, $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical;

c) a second phosphite selected from the group consisting of:
  (i) a second arylalkyl diphosphite of formula (I), wherein $R^1$, $R^2$, $R^3$, $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical, which is different from said first arylalkyl diphosphite and
  (ii) a triarylphosphite having a formula,

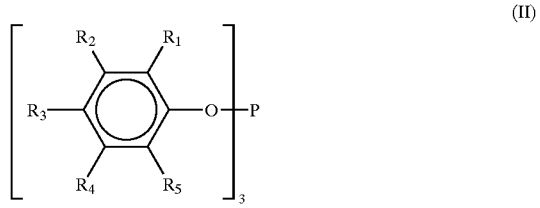
(II)

wherein $R^1$, $R^2$, $R^3$, $R^4$, and $R^5$ are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical;

d) a hindered phenol; and
e) water.

32. An article of manufacture prepared from a polymer produced by a process comprising the step of blending:
a) a polyolefin;
b) a first phosphite, which is an arylalkyl diphosphite having a formula,

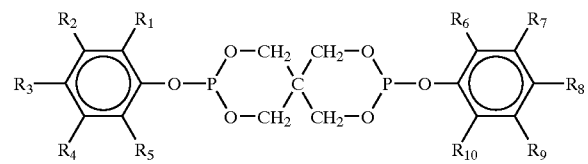
(I)

wherein $R^1$, $R^2$, $R^3$ $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical;

c) a second phosphite selected from the group consisting of:
  (i) a second arylalkyl diphosphite of formula (I), wherein $R^1$, $R^2$, $R^3$, $R^4$, $R^5$, $R^6$, $R^7$, $R^8$, $R^9$, and $R^{10}$ can be the same or different and are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical, which is different from said first arylalkyl diphosphite and
  (ii) a triarylphosphite having a formula,

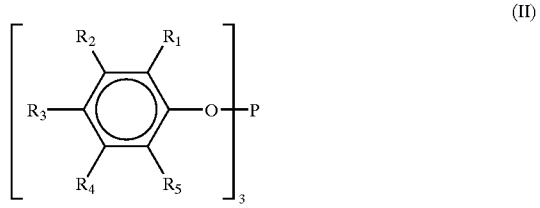
(II)

wherein $R^1$, $R^2$, $R^3$, $R^4$, and $R^5$ are selected from the group consisting of hydrogen and straight-chained or branched, cyclic or acyclic, aromatic or aliphatic, and mixed aliphatic, aromatic, and/or cycloaliphatic organic radicals having from about 1 to about 20 carbon atoms per radical;

d) a hindered phenol; and
e) water.

* * * * *